US011682798B2

(12) United States Patent
Akaishi

(10) Patent No.: US 11,682,798 B2
(45) Date of Patent: *Jun. 20, 2023

(54) VEHICULAR BATTERY CONTROL DEVICE

(71) Applicant: TOYOTA JIDOSHA KABUSHIKI KAISHA, Toyota (JP)

(72) Inventor: Takayuki Akaishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,082

(22) Filed: Apr. 25, 2022

(65) Prior Publication Data

US 2022/0255149 A1    Aug. 11, 2022

Related U.S. Application Data

(63) Continuation of application No. 16/727,180, filed on Dec. 26, 2019, now Pat. No. 11,349,158.

(30) Foreign Application Priority Data

Jan. 7, 2019    (JP) .............................. JP2019-000780

(51) Int. Cl.
*H01M 10/44* (2006.01)
*B60R 16/04* (2006.01)
(Continued)

(52) U.S. Cl.
CPC ........... *H01M 10/443* (2013.01); *B60R 16/04* (2013.01); *H01M 10/0525* (2013.01); *H01M 10/425* (2013.01); *H01M 10/486* (2013.01); *H02J 7/007* (2013.01); *H01M 2010/4271* (2013.01); *H01M 2200/10* (2013.01); *H01M 2220/20* (2013.01)

(58) Field of Classification Search
None
See application file for complete search history.

(56) References Cited

U.S. PATENT DOCUMENTS 9,793,733 B2 * 10/2017 Hempel .............. H01M 10/443
2004/0215385 A1   10/2004 Aizawa et al.
(Continued)

FOREIGN PATENT DOCUMENTS

JP    2015-156357 A    8/2015
JP    2018-113814 A    7/2018

*Primary Examiner* — Daniel Kessie
*Assistant Examiner* — Terrence R Willoughby
(74) *Attorney, Agent, or Firm* — Oblon, McClelland, Maier & Neustadt, L.L.P.

(57) ABSTRACT

A vehicular battery control device controls an electric storage amount of a battery as which a lithium-ion battery is employed. The vehicular battery control device includes a control unit that reduces the electric storage amount of the battery until the electric storage amount of the battery assumes a second state, before the lapse of a first time, when the electric storage amount of the battery assumes a first state and it is predicted that a charge current will flow in the first time. The first state is a state where lithium metal is precipitated by charging the battery with a predetermined amount of electric power, and the second state is a state where no lithium metal is precipitated even when the charge current flows through the battery.

6 Claims, 6 Drawing Sheets

(51) Int. Cl.
   *H01M 10/0525* (2010.01)
   *H01M 10/48* (2006.01)
   *H02J 7/00* (2006.01)
   *H01M 10/42* (2006.01)

(56) References Cited

U.S. PATENT DOCUMENTS

| | | |
|---|---|---|
| 2010/0000809 A1 | 1/2010 | Nishi et al. |
| 2011/0109274 A1* | 5/2011 | Minamiura ......... H02J 7/00714 320/134 |
| 2013/0255075 A1* | 10/2013 | Fujimaki ............... H01M 10/44 29/623.5 |
| 2014/0042973 A1 | 2/2014 | Kawahara et al. |
| 2016/0006274 A1* | 1/2016 | Tu ..................... H02J 7/007184 320/162 |
| 2016/0280072 A1 | 9/2016 | Okamura et al. |
| 2018/0115024 A1* | 4/2018 | Sugeno ..................... H02J 7/35 |
| 2019/0232789 A1 | 8/2019 | Kinoshita |
| 2021/0021000 A1 | 1/2021 | Sada et al. |

* cited by examiner

VEHICULAR BATTERY CONTROL DEVICE

INCORPORATION BY REFERENCE

The present application is a Continuation of U.S. patent application Ser. No. 16/727,180 filed Dec. 26, 2019, and claims priority of Japanese Patent Application No. 2019-000780 filed on Jan. 7, 2019, including the specification, drawings and abstract is incorporated herein by reference in its entirety.

BACKGROUND

1. Technical Field

The disclosure relates to a vehicular battery control device that controls an electric storage amount of an in-vehicle battery as which a lithium-ion battery is employed.

2. Description of Related Art

In Japanese Patent Application Publication No. 2015-156357 (JP 2015-156357 A), there is disclosed an electric power supply system employing a lithium-ion battery. In the electric power supply system of this Japanese Patent Application Publication No. 2015-156357 (JP 2015-156357 A), the temperature of the lithium-ion battery is raised to a predetermined temperature range through the performance of charge/discharge by a control unit, such that the lithium-ion battery can achieve a favorable performance.

SUMMARY

The art described in Japanese Patent Application Publication No. 2015-156357 (JP 2015-156357 A) is the control of raising the temperature of the lithium-ion battery. However, there occurs a phenomenon of precipitation of lithium metal in the lithium-ion battery when the lithium-ion battery is further charged at a low temperature and with a large electric storage amount. This precipitation of lithium metal may cause smoking and ignition, and deteriorates the safety of the battery. Therefore, there is room for consideration of a method of performing control such that the lithium-ion battery whose temperature is low does not cause precipitation of lithium metal in the case where the lithium-ion battery is provided in an electric power supply system in which a charge current that makes it difficult to control the lithium-ion battery is produced, for example, a vehicular electric power supply system.

The disclosure has been made in view of the aforementioned problem. It is an object of the disclosure to provide a vehicular battery control device that can suppress the occurrence of precipitation of lithium metal in a lithium-ion battery whose temperature is low.

In order to solve the above-mentioned problem, according to one aspect of the disclosure, there is provided a vehicular battery control device that controls an electric storage amount of an auxiliary battery or an automatic driving backup battery as which a lithium-ion battery is employed. The vehicular battery control device is equipped with a determination unit that determines, based on a temperature of the battery, whether or not the electric storage amount of the battery assumes a first state where lithium metal is precipitated by charging the battery with a predetermined amount of electric power, a prediction unit that predicts, based on a running state of a vehicle, whether or not a charge current corresponding to charge with the predetermined amount of electric power will flow from a vehicle instrument connected to the battery to the battery in a predetermined first time, and a control unit that reduces the electric storage amount of the battery until the electric storage amount of the battery assumes a second state where no lithium metal is precipitated even when the charge current flows through the battery, before lapse of the first time, when the determination unit determines that the electric storage amount of the battery assumes the first state and the prediction unit predicts that the charge current will flow in the first time.

According to the vehicular battery control device of the aforementioned disclosure, when it is predicted that the charge current leading to precipitation of lithium metal in the in-vehicle battery will be produced, the electric storage amount of the in-vehicle battery is reduced to an electric storage amount where no lithium metal is precipitated. Thus, the occurrence of precipitation of lithium metal in the lithium-ion battery whose temperature is low can be suppressed.

BRIEF DESCRIPTION OF THE DRAWINGS

Features, advantages, and technical and industrial significance of an exemplary embodiment will be described below with reference to the accompanying drawings, in which like numerals denote like elements, and wherein.

DETAILED DESCRIPTION OF EMBODIMENT

In a vehicular electric power supply control device according to the disclosure, in the case where an in-vehicle battery assumes a state of low temperature and large electric storage amount where lithium metal may be precipitated when the in-vehicle battery is charged from its current state, the electric storage amount of the in-vehicle battery is reduced to an electric storage amount where no lithium metal is precipitated even when a charge current leading to precipitation of lithium metal flows through the in-vehicle battery, if it is predicted that the charge current will be produced in the in-vehicle battery while running in the future. Thus, the occurrence of precipitation of lithium metal can be suppressed in the lithium-ion battery whose temperature is low.

Embodiment

The embodiment of the disclosure will be described hereinafter in detail with reference to the drawings.

Configuration

Figure 1:
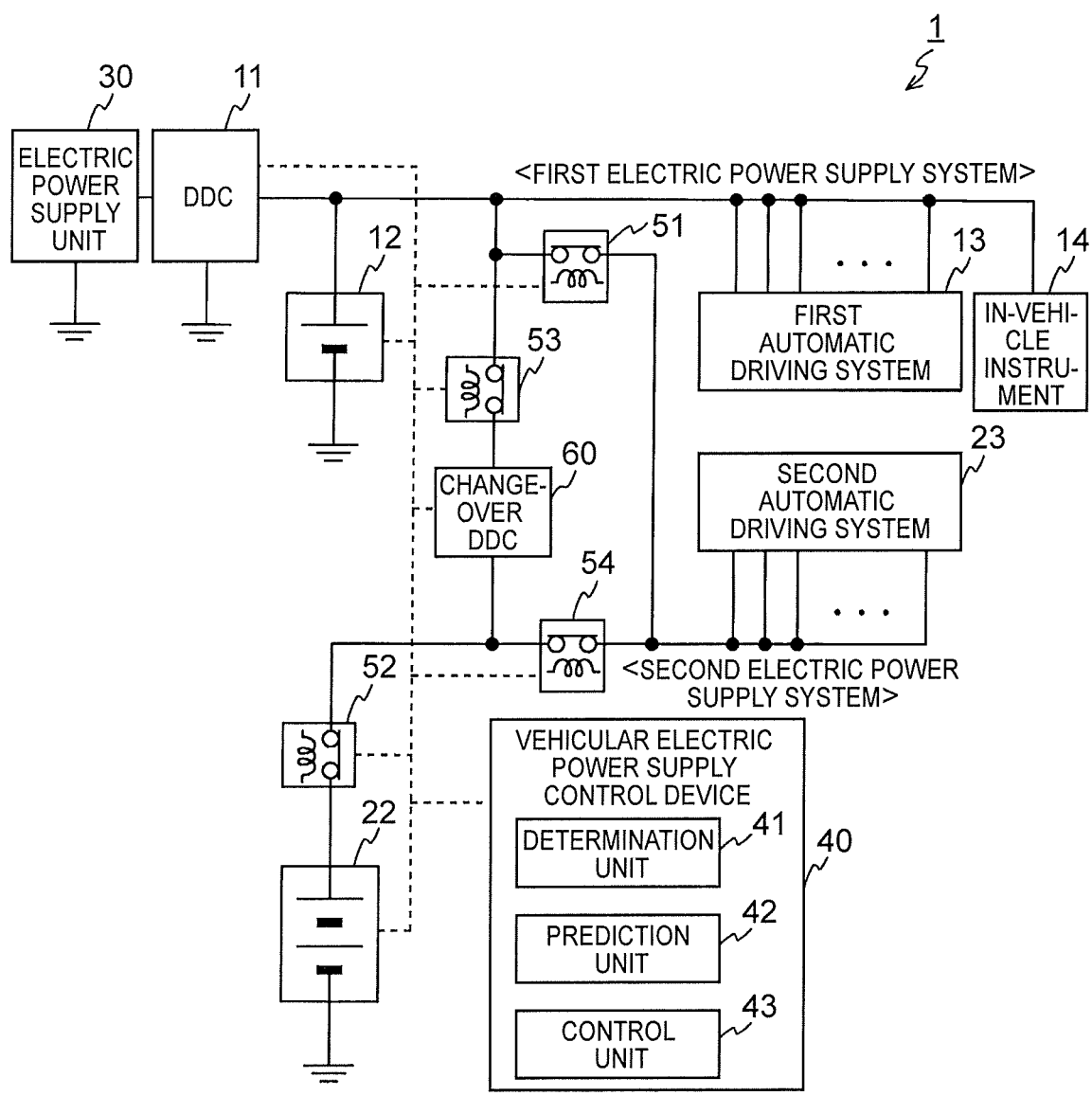
FIG. 1 is a view showing an exemplary schematic configuration of an electric power supply system that includes a vehicular electric power supply control device according to the present embodiment.

FIG. 1 is a view showing an exemplary schematic configuration of an electric power supply system 1 that includes a vehicular electric power supply control device 40 according to the embodiment of the disclosure. The electric power supply system 1 exemplified in FIG. 1 is mounted in a vehicle, and is equipped with a first electric power supply system including an electric power supply unit 30, a DCDC converter (DDC) 11, a first battery 12, a first automatic driving system 13, and an in-vehicle instrument 14, a second electric power supply system including a second battery 22 and a second automatic driving system 23, and the vehicular electric power supply control device 40.

In this electric power supply system 1, a redundant electric power supply configuration that is composed of the first electric power supply system and the second electric power supply system is adopted. The first electric power supply system and the second electric power supply system are connected to each other via a first relay device 51 for supplying dark current. Besides, the first electric power supply system and the second electric power supply system are connected to each other via a third relay device 53 and a changeover DCDC converter (changeover DDC) 60. The second battery 22 is connected to the changeover DCDC converter 60 via a second relay device 52 for battery protection, and is further connected to the second automatic driving system 23 via a fourth relay device 54. The connection/disconnection of this first relay device 51, this second relay device 52, this third relay device 53, this fourth relay device 54, and this changeover DCDC converter 60 is controlled by the vehicular electric power supply control device 40.

The electric power supply unit 30 can supply electric power to the DCDC converter 11. A high-voltage battery configured in a chargeable/dischargeable manner, for example, a lithium-ion battery or the like is employed as this electric power supply unit 30.

The DCDC converter 11 can convert electric power that is supplied from the electric power supply unit 30, and output the converted electric power to the first battery 12, the first automatic driving system 13, and the in-vehicle instrument 14. In concrete terms, the DCDC converter 11 steps down high-voltage electric power that is supplied from the electric power supply unit 30 to low-voltage electric power, and outputs this low-voltage electric power to the first battery 12, the first automatic driving system 13, and the in-vehicle instrument 14. Incidentally, a plurality of DCDC converters 11 may be provided in parallel, in accordance with a purpose such as the enhancement of converter performance or the like.

The first battery 12 is an electric power storage element configured in a chargeable/dischargeable manner, for example, a lead storage battery, a lithium-ion battery or the like, and is a so-called auxiliary battery. In the present embodiment, a lithium-ion battery is employed as the first battery 12. This first battery 12 can accumulate (be charged with) the electric power that is output from the DCDC converter 11, and output (discharge) the electric power accumulated therein to the first automatic driving system 13 and the in-vehicle instrument 14.

The first automatic driving system 13 is a system including in-vehicle instruments that are needed to automatically drive the vehicle. For example, an automatic driving electronic control unit (ECU), an electrically operated brake device (EBS), an electrically operated power steering device (EPS), and the like are included in the in-vehicle instruments that are required for automatic driving.

The in-vehicle instrument 14 includes one or more in-vehicle instruments (auxiliaries) that are irrelevant to automatic driving of the vehicle. This in-vehicle instrument 14 includes, for example, devices such as a headlamp, a wiper and the like.

The second battery 22 is an electric power storage element that is configured in a chargeable/dischargeable manner, for example, a lithium-ion battery, a nickel hydride battery or the like, and is a so-called automatic driving backup battery. In the present embodiment, a lithium-ion battery is employed as the second battery 22. This second battery 22 can accumulate (be charged with) the electric power that is output from the DCDC converter 11, and output (discharge) the electric power accumulated therein to the first automatic driving system 13, via the third relay device 53, the changeover DCDC converter 60, and the second relay device 52. Besides, the second battery 22 can output (discharge) the electric power accumulated therein to the second automatic driving system 23, via the second relay device 52 and the fourth relay device 54. This second battery 22 plays a role of a backup electric power supply for maintaining the function regarding the movement of the vehicle in the case where the first battery 12 fails during the driving of the vehicle.

The second automatic driving system 23 is obtained by redundantly providing the same system as the first automatic driving system 13. As is the case with the first automatic driving system 13, the second automatic driving system 23 is a system including in-vehicle instruments that are needed to automatically drive the vehicle.

The first relay device 51 is provided between the first electric power supply system and the second electric power supply system, and is configured to be able to connect/disconnect the first electric power supply system and the second electric power supply system to/from each other, through the control of the vehicular electric power supply control device 40. This first relay device 51 is connected when a vehicle electric power supply is turned off at the time of parking or the like, and forms a path for supplying dark current from the first battery 12 to the second automatic driving system 23. Otherwise, the first relay device 51 is disconnected, and electrically separates the first electric power supply system and the second electric power supply system from each other.

The changeover DCDC converter 60 and the third relay device 53 are provided in series between the first electric power supply system and the second electric power supply system, and is configured to be able to connect/disconnect the first electric power supply system and the second electric power supply system to/from each other through the control of the vehicular electric power supply control device 40. The electric power that is exchanged between the first electric power supply system and the second electric power supply system when these systems are connected to each other is controlled by the changeover DCDC converter 60.

The second relay device 52 is provided between the second electric power supply system side of the changeover DCDC converter 60 and the second battery 22, and is configured to be able to connect/disconnect the second electric power supply system and the second battery to/from each other through the control of the vehicular electric power supply control device 40. This second relay device 52 is disconnected when the vehicle electric power supply is turned off at the time of parking or the like, and prevents the consumption of current from the second battery 22 to the second automatic driving system 23. Otherwise, the second relay device 52 is connected, and supplies electric power to the second automatic driving system 23.

The fourth relay device 54 is provided between the second electric power supply system side of the changeover DCDC converter 60 and the second automatic driving system 23, and is configured to be able to connect/disconnect the second electric power supply system and the second battery 22 to/from each other (via the second relay device 52) through the control of the vehicular electric power supply control device 40.

The vehicular electric power supply control device 40 can control the state of the electric power supply system 1 by managing the states, operations and the like of the DCDC converter 11, the first battery 12, the second battery 22, the first relay device 51, the second relay device 52, the third relay device 53, the fourth relay device 54, and the changeover DCDC converter 60. In the vehicular electric power supply control device 40 of the present embodiment, the control for suppressing the occurrence of precipitation of lithium in each of lithium-ion batteries employed as the first battery 12 and the second battery 22 is performed.

This vehicular electric power supply control device 40 can be configured as an ECU that typically includes a processor, a memory, an input/output interface, and the like. The vehicular electric power supply control device 40 can include one, some or all of ECU's that are mounted in the vehicle, such as a monitoring ECU that can monitor voltages, currents, and temperatures of the first battery 12 and the second battery 22, an electric power supply ECU that can control connection/disconnection states of the first relay device 51, the second relay device 52, the third relay device 53, and the fourth relay device 54 and that can control output voltages of the DCDC converter 11 and the changeover DCDC converter 60, and the like. The vehicular electric power supply control device 40 of the present embodiment realizes the respective functions of a determination unit 41, a prediction unit 42, and a control unit 43 through the readout and execution of a program stored in the memory by the processor.

The determination unit 41 determines, based on the temperature of each of the first battery 12 and the second battery 22 as which the lithium-ion battery is employed, whether or not the electric storage amount of each of the batteries assumes the first state where lithium metal is precipitated, when each of the batteries is charged with the predetermined amount of electric power. Charge with the predetermined amount of electric power can be set based on a maximum current producible in the vehicle, which is determined in accordance with the specification, equipment and the like of the vehicle. The electric storage amount where lithium metal is precipitated from the lithium-ion battery is indicated as an electric storage amount (SOC) at the time when the negative electrode potential upon charging the lithium-ion battery is lower than 0V as a reference potential where lithium metal is dissolved and precipitated.

Figure 2:
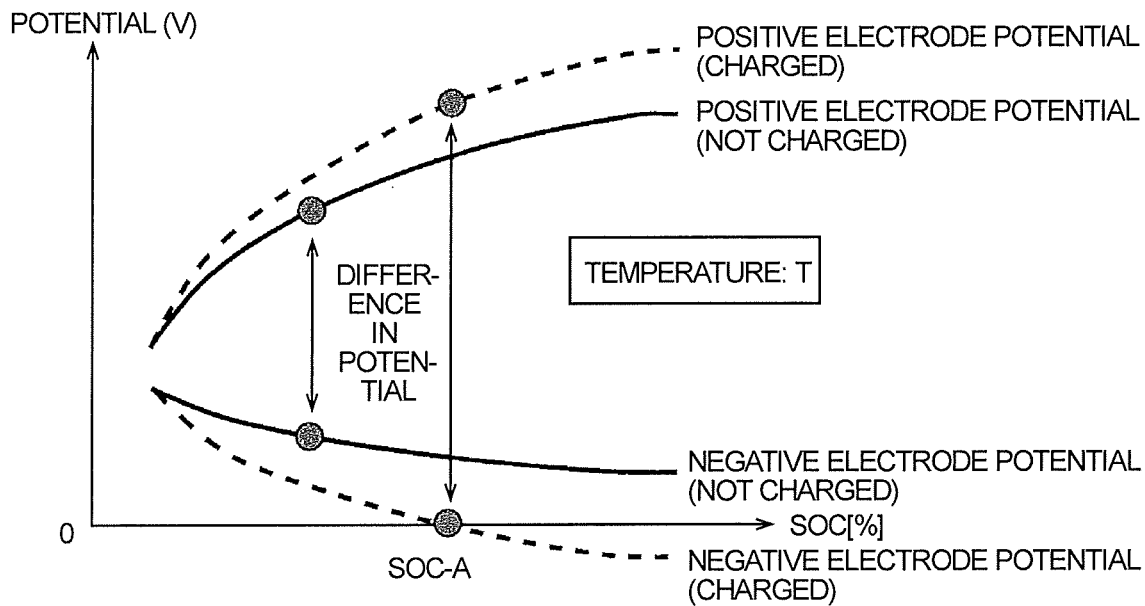
FIG. 2 is a view showing an exemplary relationship among a positive electrode potential, a negative electrode potential, and an electric storage amount of a lithium-ion battery.

FIG. 2 shows an exemplary relationship between the positive electrode potential and the negative electrode potential of the lithium-ion battery and the electric storage amount (SOC) at a certain temperature T. In the example of FIG. 2, the positive electrode potential and the negative electrode potential at the time when the lithium-ion battery is not charged are indicated by solid lines, and the positive electrode potential and the negative electrode potential at the time when the lithium-ion battery is charged with the predetermined amount of electric power are indicated by broken lines. This example of FIG. 2 reveals that although there is no possibility of precipitation of lithium metal regardless of the electric storage amount of the lithium-ion battery unless the lithium-ion battery is charged, lithium metal is precipitated when the electric storage amount is equal to or larger than SOC-A in the case where the lithium-ion battery is charged. This is ascribable to the fact that the difference in potential is enlarged through a rise in the positive electrode potential and a fall in the negative electrode potential as a result of a fall in internal resistance due to a charge current and a polarization reaction. Under a condition of the temperature T exemplified in FIG. 2, the electric storage amount SOC-A is the electric storage amount of each of the first battery 12 and the second battery 22 that may become equal to or larger than the electric storage amount where lithium metal is precipitated from the lithium-ion battery.

The determination unit 41 holds in advance a temperature-SOC map (FIG. 3) representing the possibility of precipitation of lithium metal, from which the electric storage amount SOC-A at each temperature within a predetermined temperature range is obtained, and determines, based on this temperature-SOC map, whether or not the electric storage amount of each of the first battery 12 and the second battery 22 assumes the first state where lithium metal is precipitated by charging the battery with the predetermined amount of electric power. The determination unit 41 may hold a plurality of such temperature-SOC maps in accordance with a charge rate. For example, the determination unit 41 can hold two temperature-SOC maps at the time of automatic driving and parking as will be described later.

The prediction unit 42 predicts, based on a running state of the vehicle, whether or not a charge current corresponding to charge with the predetermined amount of electric power will flow from the vehicle instruments connected to the first battery 12 and the second battery 22, namely, the first automatic driving system 13, the in-vehicle instrument 14, and the second automatic driving system 23 to the battery in a predetermined first time. In more concrete terms, it is predicted, based on the running state of the vehicle, whether or not the charge current that cannot be controlled by the DCDC converter 11 and the changeover DCDC converter 60 will flow through the first battery 12 and/or the second battery 22. The predetermined first time is set equal to or longer than a time that is required from prediction by the prediction unit 42 to the completion of control by the control unit 43. The following scenes can be exemplified as scenes in which the charge current that cannot be controlled by this DCDC converter flows through the battery.

The scenes are; (1) the scene in which current flows from the DCDC converter to the battery until voltage control of the DCDC converter follows a change in the supply of current in the case where the supply of current to an electrically operated power steering device (EPS) becomes unnecessary after supplying a large current to the EPS, (2) the scene in which current flows from the DCDC converter to the battery until voltage control of the DCDC converter follows a change in the supply of current in the case where the supply of current to an electrically operated brake device (EBS) becomes necessary after supplying a large current to the EBS, (3) the scene in which regenerative current flows from a motor for EPS to the battery until a steering returns to a neutral position from a position where the steering is steered at a maximum angle.

When the determination unit 41 determines that the electric storage amount of each of the first battery 12 and the second battery 22 assumes the first state, the control unit 43 calculates a safe electric storage amount where no lithium metal is precipitated even when the battery is charged with the predetermined amount of electric power. The safe electric power storage amount is an electric storage amount in a second state in the temperature-SOC map exemplified in FIG. 3, and can be calculated based on the temperature of each of the first battery 12 and the second battery 22. Then, the control unit 43 reduces the electric storage amount of each of the first battery 12 and the second battery 22 until the electric storage amount assumes the second state equal to or smaller than the calculated safe electric storage amount, before the lapse of the first time predicted by the prediction unit 42.

The control according to the respective functions of the determination unit 41, the prediction unit 42, and the control unit 43 that are realized by the vehicular electric power supply control device 40 will be described hereinafter in more detail.

Control

Figure 4:
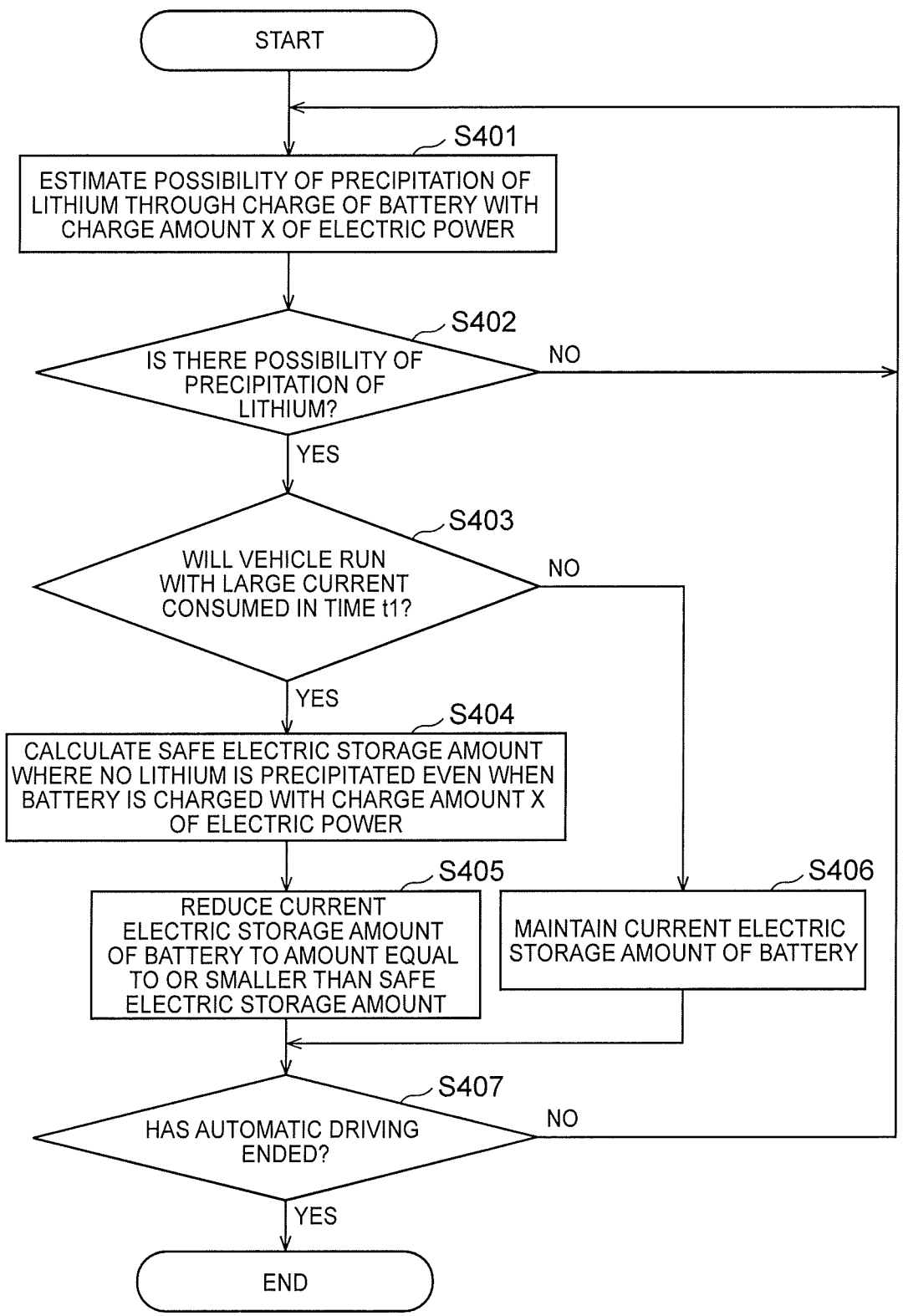
FIG. 4 is a processing flowchart of electric storage amount control A of a battery that is performed by the vehicular electric power supply control device.
Figure 5:
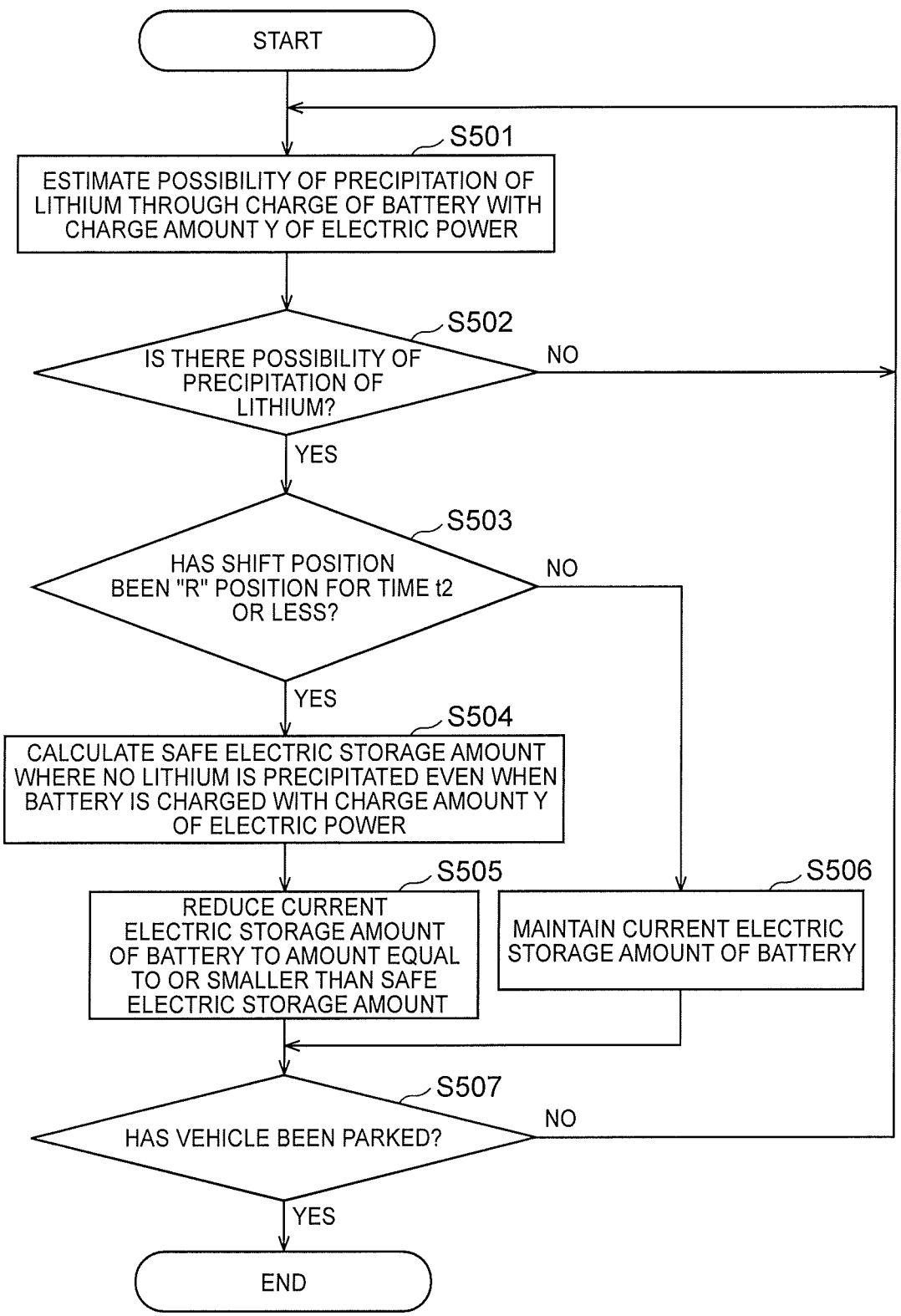
FIG. 5 is a processing flowchart of electric storage amount control B of the battery that is performed by the vehicular electric power supply control device.
Figure 6:
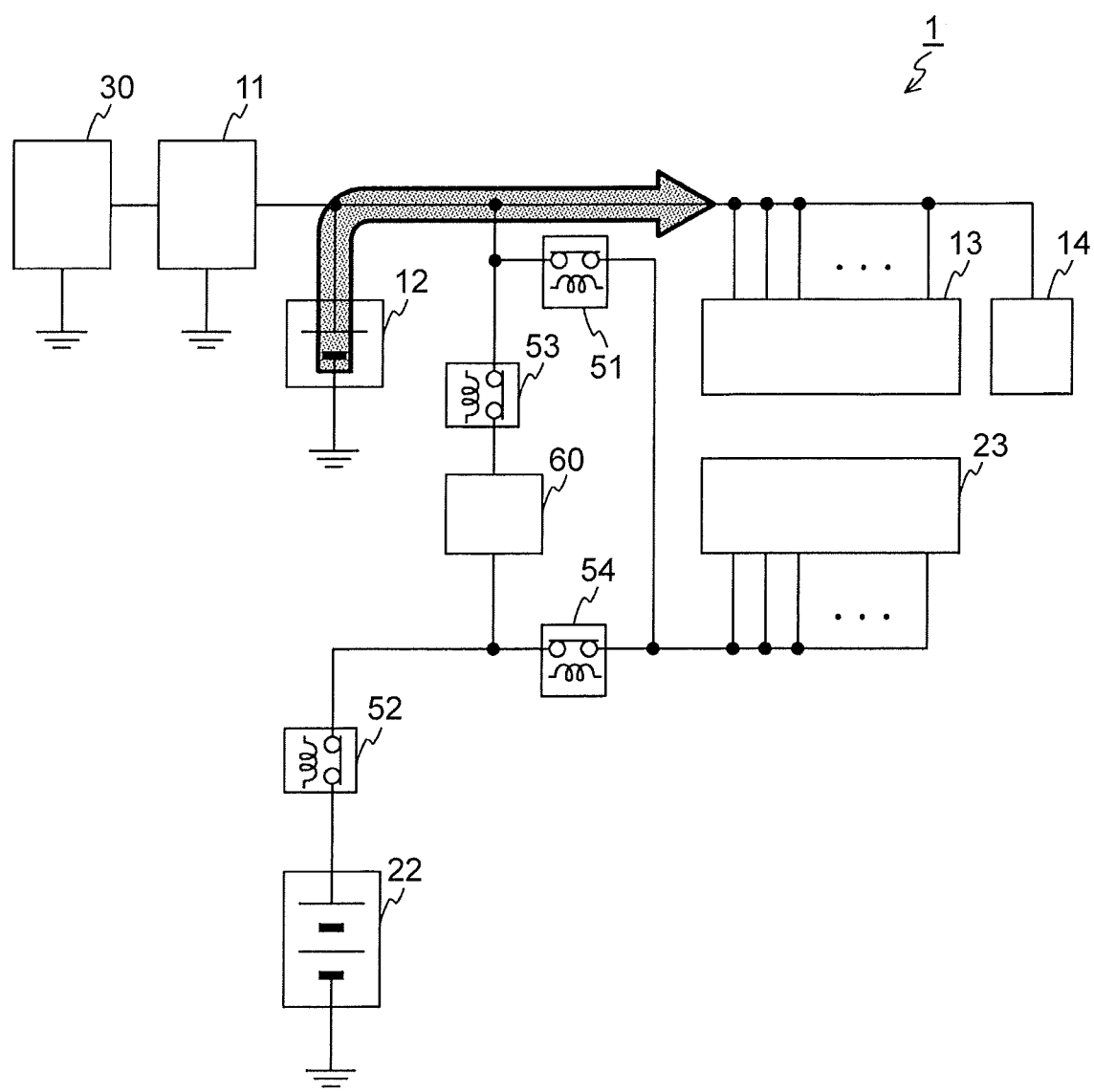
FIG. 6 is a view illustrating a discharge path of a first battery.
Figure 7:
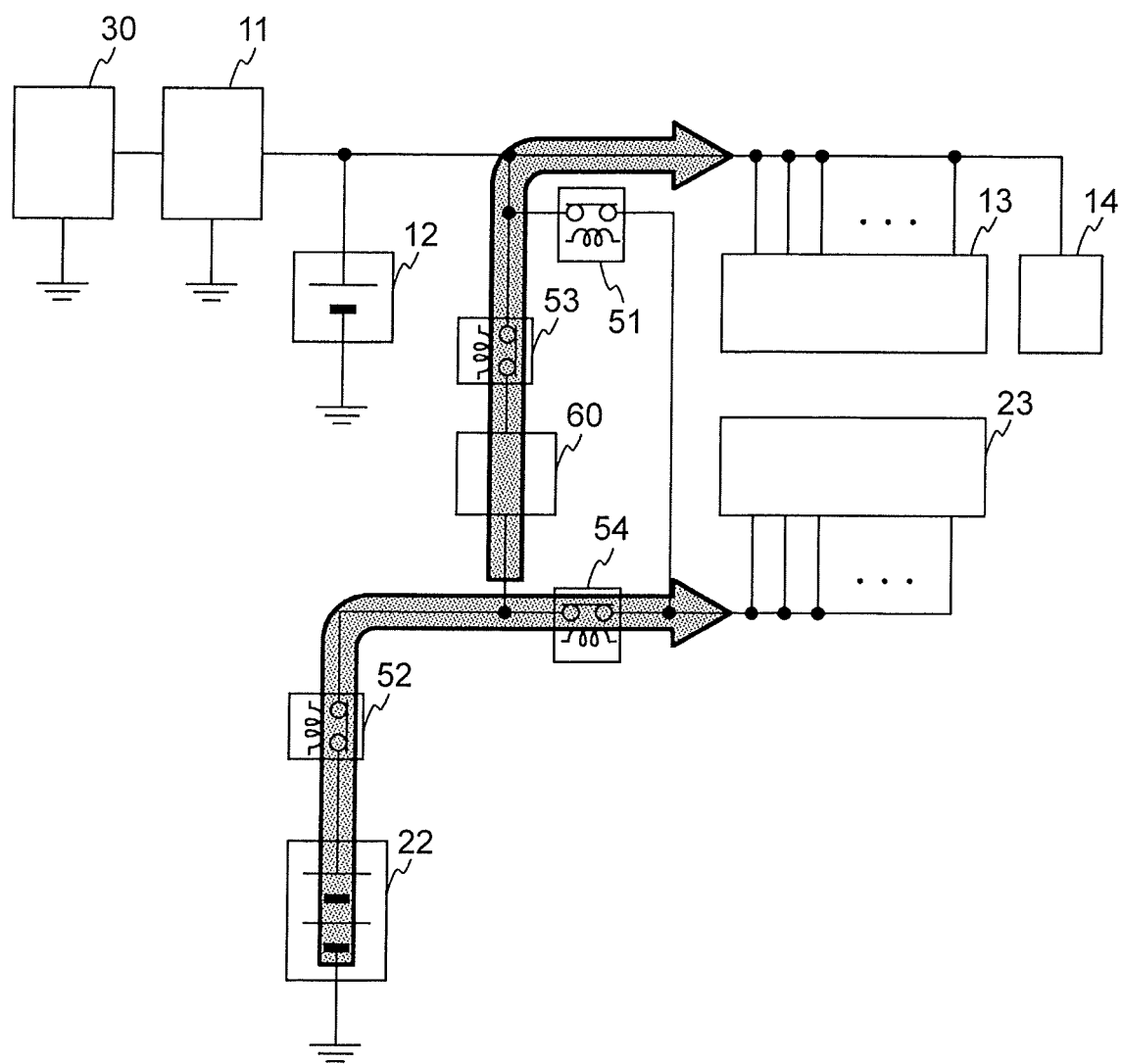
FIG. 7 is a view illustrating a discharge path of a second battery.

Electric storage amount control that is performed by the vehicular electric power supply control device 40 according to the embodiment of the disclosure will be described with further reference to FIGS. 4 to 7. FIG. 4 is a flowchart showing a processing procedure of electric storage amount control (electric storage amount control A) of each of the first battery 12 and the second battery 22 that is performed by the vehicular electric power supply control device 40 in automatic driving of the vehicle. FIG. 5 is a flowchart showing a processing procedure of electric storage amount control (electric storage amount control B) of each of the first battery 12 and the second battery 22 that is performed by the vehicular electric power supply control device 40 during parking of the vehicle. FIG. 6 is a view illustrating a discharge path of the first battery 12. FIG. 7 is a view illustrating a discharge path of the second battery 22. Incidentally, the description of the following flowcharts will be given by referring to each of the first battery 12 and the second battery 22 simply as "the battery" in the case where each of the first battery 12 and the second battery 22 is relevant.

(1) Electric Storage Amount Control A

The process shown in FIG. 4 is started by starting automatic driving with the electric power supply of the vehicle on (IG-ON).

In step S401, the determination unit 41 estimates the possibility of precipitation of lithium metal from the battery in the case where the battery is charged with the predetermined amount of electric power. This estimation is carried out, based on the temperature of the battery and the above-mentioned temperature-SOC map (FIG. 3), depending on whether or not the electric storage amount of the battery assumes the first state where lithium metal is precipitated in the case where the battery is charged with a charge amount X of electric power that is determined based on the state of automatic driving.

In step S402, the determination unit 41 determines, as a result of the estimation in the aforementioned step S401, whether or not there is a possibility of precipitation of lithium metal from the battery. If there is a possibility of precipitation of lithium metal from the battery (Yes in S402), the process proceeds to step S403. If there is no possibility of precipitation of lithium metal from the battery (No in S402), the process proceeds to step S401.

In step S403, the prediction unit 42 predicts, based on the running state of the vehicle, whether or not the charge current corresponding to charge with the predetermined amount of electric power will flow through the battery in the first time. In electric storage amount control A in this automatic driving, the prediction unit 42 predicts, based on map information or the like, whether or not the vehicle will run with a large current corresponding to the charge amount X consumed in a first time t1, in a scheduled running path of the vehicle through automatic driving. For example, running on a curve with the electrically operated power steering device in operation, or running on a downhill with the electrically operated brake device in operation can be mentioned as running with the large current consumed that can be predicted based on map information or the like. If the vehicle will run with the large current consumed in the first time t1 (Yes in S403), the process proceeds to step S404. If the vehicle will not run with the large current consumed in the first time t1 (No in S403), the process proceeds to step S406.

Figure 3:
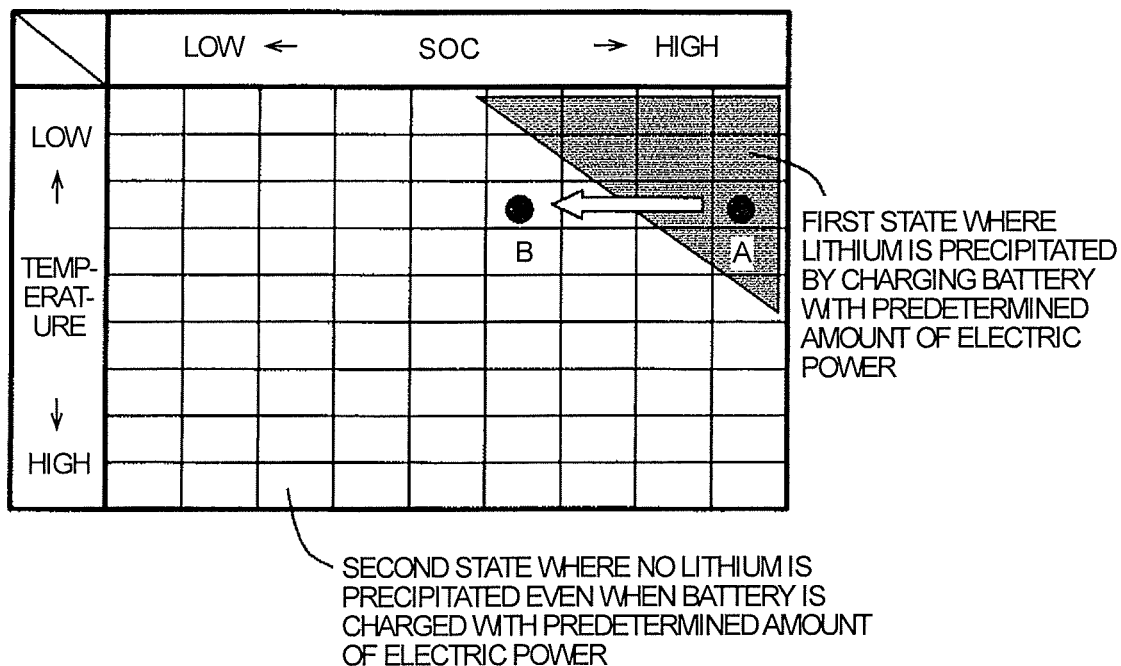
FIG. 3 is a view showing an exemplary temperature-SOC map that represents the possibility of precipitation of lithium metal.

In step S404, the prediction unit 42 calculates the safe electric storage amount where no lithium metal is precipitated from the battery even when the battery is charged with the large current corresponding to the charge amount X. The safe electric storage amount is calculated based on the temperature of the battery and the above-mentioned temperature-SOC map (FIG. 3). In the example of FIG. 3, when the temperature of the battery remains the same, the safe electric storage amount for an electric storage amount A is determined as an electric storage amount B. When the safe electric storage amount is calculated, the process proceeds to step S405.

In step S405, the control unit 43 reduces the current electric storage amount of the battery to an amount equal to or smaller than the safe electric storage amount calculated in step S404. The reduction of this electric storage amount is carried out before the lapse of the first time t1 predicted by the prediction unit 42. When the battery to be controlled is the first battery 12, the electric storage amount can be reduced by controlling the voltage of the DCDC converter 11 and forcibly discharging electric power from the first battery 12 to the first automatic driving system 13 and the in-vehicle instrument 14 as shown in, for example, FIG. 6. Besides, when the battery to be controlled is the second battery 22, the electric storage amount can be reduced by controlling the connection states of the second relay device 52, the third relay device 53, and the fourth relay device 54 and the voltage of the changeover DCDC converter 60, forcibly discharging electric power from the second battery 22 to the second automatic driving system 23, and further discharging electric power from the second battery 22 to the first automatic driving system 13 and the in-vehicle instrument 14 as well if necessary, as shown in, for example, FIG. 7. When the electric storage amount of the battery becomes equal to or smaller than the safe electric storage amount, the process proceeds to step S407.

In step S406, the control unit 43 maintains the current electric storage amount of the battery. Incidentally, if the electric storage amount of the battery has already been reduced to an amount equal to or smaller than the safe electric storage amount in an immediately preceding process, the battery may be charged to the original electric storage amount without maintaining the electric storage amount of the battery. After that, the process proceeds to step S407.

In step S407, the vehicular electric power supply control device 40 determines whether or not automatic driving of the vehicle has been ended. If automatic driving has not been ended (No in S407), the process proceeds to step S401. If automatic driving has been ended (Yes in S407), the present process is ended.

(2) Electric Storage Amount Control B

The process shown in FIG. 5 is started with the electric power supply of the vehicle on (IG-ON).

In step S501, the determination unit 41 estimates the possibility of precipitation of lithium metal from the battery when the battery is charged with the predetermined amount of electric power. This estimation is carried out, based on the temperature of the battery and the above-mentioned temperature-SOC map (FIG. 3), depending on whether or not the electric storage amount of the battery assumes the first state where lithium metal is precipitated when the battery is charged with a charge amount Y that is determined based on the state of parking.

In step S502, the determination unit 41 determines, as a result of the estimation in the aforementioned step S501, whether or not there is a possibility of precipitation of lithium metal from the battery. If there is a possibility of precipitation of lithium metal from the battery (Yes in S502), the process proceeds to step S503. If there is no possibility of precipitation of lithium metal from the battery (No in S502), the process proceeds to step S501.

In step S503, the prediction unit 42 predicts, based on the running state of the vehicle, whether or not a charge current corresponding to charge with a predetermined amount of electric power will flow through the battery in the predetermined first time t1. In electric storage amount control B during this parking, the prediction unit 42 estimates that the vehicle is about to be parked, depending on whether or not a shift position has been a reverse (backward) "R" position for a second time t2 or less, and predicts that a charge current Ic regenerated from the motor for EPS will flow through the battery in the first time t1. If the shift position has been the R position for the second time t2 or less (Yes in S503), the process proceeds to step S504. If the shift position has not been the R position for the second time t2 or less (No in S503), the process proceeds to step S506.

In step S504, the prediction unit 42 calculates a safe electric storage amount where no lithium metal is precipitated from the battery even when the battery is charged with a large current corresponding to the charge amount Y. The safe electric storage amount is calculated based on the temperature of the battery and the above-mentioned temperature-SOC map (FIG. 3). When the safe electric storage amount is calculated, the process proceeds to step S505.

In step S505, the control unit 43 reduces the current electric storage amount of the battery to an amount equal to or smaller than the safe electric storage amount calculated in step S404. This reduction of the electric storage amount is carried out before the lapse of the first time t1 predicted by the prediction unit 42. A forcible discharge path for reducing the electric storage amount of the battery to be controlled has been described using FIGS. 6 and 7. When the electric storage amount of the battery becomes equal to or smaller than the safe electric storage amount, the process proceeds to step S507.

In step S506, the control unit 43 maintains the current electric storage amount of the battery. Incidentally, if the electric storage amount of the battery has already been reduced to an amount equal to or smaller than the safe electric storage amount in an immediately preceding process, the battery may be charged to the original electric storage amount without maintaining the electric storage amount of the battery. After that, the process proceeds to step S507.

In step S507, the vehicular electric power supply control device 40 determines whether or not the vehicle has been parked. It can be determined that the vehicle has been parked, for example, when the shift position becomes a parking "P" position. If the vehicle has not been parked yet (No in S507), the process proceeds to step S501. If the vehicle has been parked (Yes in S507), the present process is ended.

Operation and Effect

In the vehicular electric power supply control device 40 according to the above-mentioned embodiment of the disclosure, in the case where the electric storage amount of the battery (the first battery 12 or the second battery 22) as which the lithium-ion battery is employed is equal to the electric storage amount (the first state) where lithium metal may be precipitated when the battery is charged from its current state, the electric storage amount of the battery is reduced to the electric storage amount (the second state) where no lithium metal is precipitated, if it is predicted that the charge current leading to precipitation of lithium metal will be produced while running in the future. Thus, the occurrence of precipitation of lithium metal can be suppressed in the lithium-ion battery whose temperature is low.

At this time, the electric power of the battery is prevented from being wastefully consumed, by reducing the electric storage amount of the battery by supplying electric power to the vehicle instruments (the first automatic driving system 13, the in-vehicle instrument 14, and the second automatic driving system 23) connected to the battery.

Incidentally, in the aforementioned embodiment, the case where both the first battery 12 and the second battery 22 are batteries as which lithium-ion batteries are employed has been described. However, only one of the first battery 12 and the second battery 22 may be a battery as which a lithium-ion battery is employed.

Although the embodiment of the disclosure has been described above, the disclosure can be grasped as a vehicular electric power supply device, an electric power supply system including the vehicular electric power supply control device, a method of estimating a full-charge capacity that is carried out by the vehicular electric power supply control device, a program for estimating the full-charge capacity, a computer-readable, non-transient recording medium in which the program is stored, or a vehicle mounted with the vehicular electric power supply control device.

The vehicular electric power supply control device of the disclosure can be utilized for a vehicle or the like that is mounted with a battery as which a lithium-ion battery is employed.

What is claimed is:

1. A vehicular battery control device that controls an electric storage amount of an auxiliary battery or an automatic driving backup battery as which a lithium-ion battery is employed, comprising:
   a determination unit configured to determine, based on a temperature of the battery, whether or not the electric storage amount of the battery assumes a first state where lithium metal is precipitated by charging the battery with a predetermined amount of electric power;
   a prediction unit configured to predict, based on a running state of a vehicle, whether or not a charge current will flow from a vehicle instrument to the battery in a predetermined first time, the charge current corresponding to charge with the predetermined amount of electric power, and the vehicle instrument being connected to the battery; and
   a control unit configured to reduce the electric storage amount of the battery by supplying electric power to the vehicle instrument connected to the battery until the electric storage amount of the battery assumes a second state where no lithium metal is precipitated even when the charge current flows through the battery, before lapse of the first time, when the determination unit determines that the electric storage amount of the battery assumes the first state and the prediction unit predicts that the charge current will flow in the first time.

2. The vehicular battery control device according to claim 1, wherein
the running state of the vehicle is a state of automatic driving where a running path of the vehicle can be estimated.

3. The vehicular battery control device according to claim 2, wherein
the running path of the vehicle is estimated based on map information.

4. The vehicular battery control device according to claim 1, wherein
the running state of the vehicle is a state before lapse of a predetermined second time from a timing when a shift position where the vehicle can be estimated to be about to be parked becomes a backward position.

5. The vehicular battery control device according to claim 1, wherein
the determination unit is configured to determine, whether or not the electric storage amount of the battery assumes the first state, based on a temperature-SOC map indicating the electric storage amount at each temperature within a predetermined temperature range.

6. The vehicular battery control device according to claim 1, wherein
the vehicle instrument connected to the battery are a first automatic driving system, an in-vehicle instrument, and an second automatic driving system.

* * * * *